(12) United States Patent
Pearce

(10) Patent No.: US 11,967,345 B2
(45) Date of Patent: Apr. 23, 2024

(54) SYSTEM AND METHOD FOR RENDERING KEY AND FILL VIDEO STREAMS FOR VIDEO PROCESSING

(71) Applicant: Grass Valley Limited, Newbury (GB)

(72) Inventor: James Edward Pearce, Hampshire (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 17/658,943

(22) Filed: Apr. 12, 2022

(65) Prior Publication Data

US 2022/0335976 A1    Oct. 20, 2022

Related U.S. Application Data

(60) Provisional application No. 63/176,069, filed on Apr. 16, 2021.

(51) Int. Cl.
| | |
|---|---|
| *G11B 27/036* | (2006.01) |
| *G06V 20/40* | (2022.01) |
| *G11B 27/034* | (2006.01) |
| *G11B 27/34* | (2006.01) |

(52) U.S. Cl.
CPC ............ *G11B 27/036* (2013.01); *G06V 20/46* (2022.01); *G11B 27/034* (2013.01); *G11B 27/34* (2013.01)

(58) Field of Classification Search
CPC ..... G11B 27/036; G11B 27/034; G11B 27/34; G06V 20/46
See application file for complete search history.

(56) References Cited

U.S. PATENT DOCUMENTS

| | | | | |
|---|---|---|---|---|
| 9,955,173 | B2* | 4/2018 | Dev | ............... H04N 19/463 |
| 2012/0249584 | A1* | 10/2012 | Naruse | ............... G06T 1/0007 |
| | | | | 382/284 |
| 2018/0255308 | A1* | 9/2018 | Yi | ............... H04N 21/44012 |

* cited by examiner

*Primary Examiner* — Girumsew Wendmagegn
(74) *Attorney, Agent, or Firm* — ARENTFOX SCHIFF LLP

(57) ABSTRACT

A system and method is provided for rendering key and fill video streams for video processing. The system includes a database that stores video data including a video stream of a sequence of images and alpha data defining transparency levels for each portion of each image. An encoder encodes each frame of the sequence of images to generate encoded composite frames that each contain a fill portion and a key portion, such that each encoded composite frame includes both the fill and key portions that are disposed horizontally and side-by side with respect to each other. A renderer having a single decoder decodes each encoded composite frame to extract pixel values from the fill portion and respective transparency levels from the key portion and in order to generate a proxy of the respective frame to be displayed by a video processing device.

20 Claims, 5 Drawing Sheets

US 11,967,345 B2

SYSTEM AND METHOD FOR RENDERING KEY AND FILL VIDEO STREAMS FOR VIDEO PROCESSING

TECHNICAL FIELD

The present application claims priority to U.S. Patent Provisional Application No. 63/176,069, filed Apr. 16, 2021, the entire comments of which are hereby incorporated by reference.

TECHNICAL FIELD

The present disclosure generally relates to video editing and content creation, and, more particularly, to a system and method for rendering key and fill proxy streams that consume a single video decoder and can be used in a system with limited processing resources.

BACKGROUND

Video editors and content creation systems typically want to use video elements with varying levels of transparency. For example, an editor may want to add an animated caption in a lower-third of the picture or a logo in the upper-right. To add these elements, they can be overlaid on top of a traditional video track. In practice, these elements are usually created in an application, such as Adobe's After Effects, and exported as a sequence of still images that support an alpha-channel, for example, PNG files.

In computer graphics editing, alpha compositing or alpha blending is the process of combining one image with a background to create the appearance of partial or full transparency. Alpha compositing is often useful to render picture elements (e.g., pixels) in separate passes or layers and then combine the resulting 2D images into a single, final image called the composite. Thus, an "alpha channel" is the additional per-pixel value that is combined with the Red, Green and Blue values to specify an opacity level (e.g., opaque, partial or full transparency) to ultimately create the composite.

Currently, compressed video formats, such as H.264, do not support alpha-channels. Instead, two separate video streams are required: (1) a "key" stream that is a monochrome video track that defines the transparency of each part (e.g., each pixel value) of the image, and (2) a "fill" stream that defines the content to which the transparency is applied. Upon receiving the two streams, a graphics processing unit (GPU) will typically apply the transparency levels defined by the key stream to the fill stream to create the composite content that can then be rendered on a display.

Obviously, requiring two video streams to render a single video element and/or track doubles the resource requirements, and requires two decoders working simultaneously to decode each separate stream. This result is particularly problematic for systems with limited resources (e.g., limited decoder availability) and attempting to render a sequence of still images in real-time also has significant performance and bandwidth requirements.

SUMMARY

Accordingly, a system and method is needed that reduces total bandwidth consumption and minimizes the resource requirements for rendering key and fill proxy streams. Specifically, a system and method is disclosed herein that provides for rendering key and fill proxy streams that consume a single video decoder and can be used in a system with limited processing resources.

In an exemplary aspect, a system is provided for rendering key and fill video streams for video processing. The system can include a database configured to store video data including at least one video stream comprising a sequence of images and alpha data defining transparency levels for each portion of each image in the sequence of images of the at least one video stream. Moreover, the system includes a content provided with an encoder configured to encode each frame of the sequence of images to generate encoded composite frames that each contain a fill portion that corresponds to the video data and a key portion that is monochrome and defines transparency levels for each portion of the respective images, such that each encoded composite frame includes both the fill and key portions that are disposed horizontally and side-by side with respect to each other. A client device including a video editing application includes a renderer having a single decoder and is configured to decode each encoded composite frame to extract pixel values from the fill portion and respective transparency levels from the key portion, and further configured to apply the respectively transparency levels to the corresponding extracted pixel values to generate a proxy of the respective frame to be displayed by a video processing device.

According to an exemplary aspect, the fill portion comprises a higher horizontal resolution than a horizontal resolution of the key portion. Moreover, video processing device is a video editing device in one aspect. Yet further, the encoder can be configured to generate each encoded frame to allocate 75% of the frame to the fill portion and 25% of the frame to the key portion.

In a refinement of the exemplary aspect, the encoder is configured to generate each encoded frame to allocate 75% of the frame to the fill portion and 25% of the frame to the key portion.

In another refinement of the exemplary aspect, the encoder is configured to generate the encoded composite frames based at least partially on source data of the video data that includes R, G, B data and the alpha data.

In another refinement of the exemplary aspect, the system includes a user interface configured to define a picture/transparency ratio between the fill portion and the key portion.

In another refinement of the exemplary aspect, the renderer includes a fragment shader configured to render the proxy by applying the respectively transparency levels to the corresponding extracted pixel values.

In yet another exemplary aspect, a system is provided for rendering key and fill video streams for video processing. In this aspect, the system includes a database configured to store video data including a sequence of images and alpha data defining transparency levels for each portion of each image in the sequence of images; an encoder configured to encode each frame of the sequence of images to generate encoded composite frames that each contain a fill portion that corresponds to the video data and a key portion that is monochrome and defines transparency levels for each portion of the respective images, such that each encoded composite frame includes both the fill and key portions that are disposed horizontally and side-by side with respect to each other; and a renderer configured to receive a stream of the encoded composite frames and having a single decoder that is configured to decode each encoded composite frame to extract pixel values from the fill portion and respective transparency levels from the key portion, and further configured to apply the respectively transparency levels to the corresponding extracted pixel values to generate a proxy of the respective frame to be displayed by a video processing device.

In yet another exemplary aspect, a system is provided for rendering key and fill video streams for video processing. In this aspect, the system includes an encoder configured to encode each frame of a sequence of images to generate encoded composite frames that each contain a fill portion that corresponds to video data of the sequence of images and a key portion that is monochrome and defines respective transparency levels, such that each encoded composite frame includes both the fill portion and the key portion; and a renderer configured to receive a stream of the encoded composite frames and configured to decode each encoded composite frame to extract pixel values from the fill portion and respective transparency levels from the key portion, and further configured to apply the respectively transparency levels to the corresponding extracted pixel values to generate an output video comprising modified frames to be displayed by a video processing device.

The above simplified summary of example aspects serves to provide a basic understanding of the exemplary embodiment of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
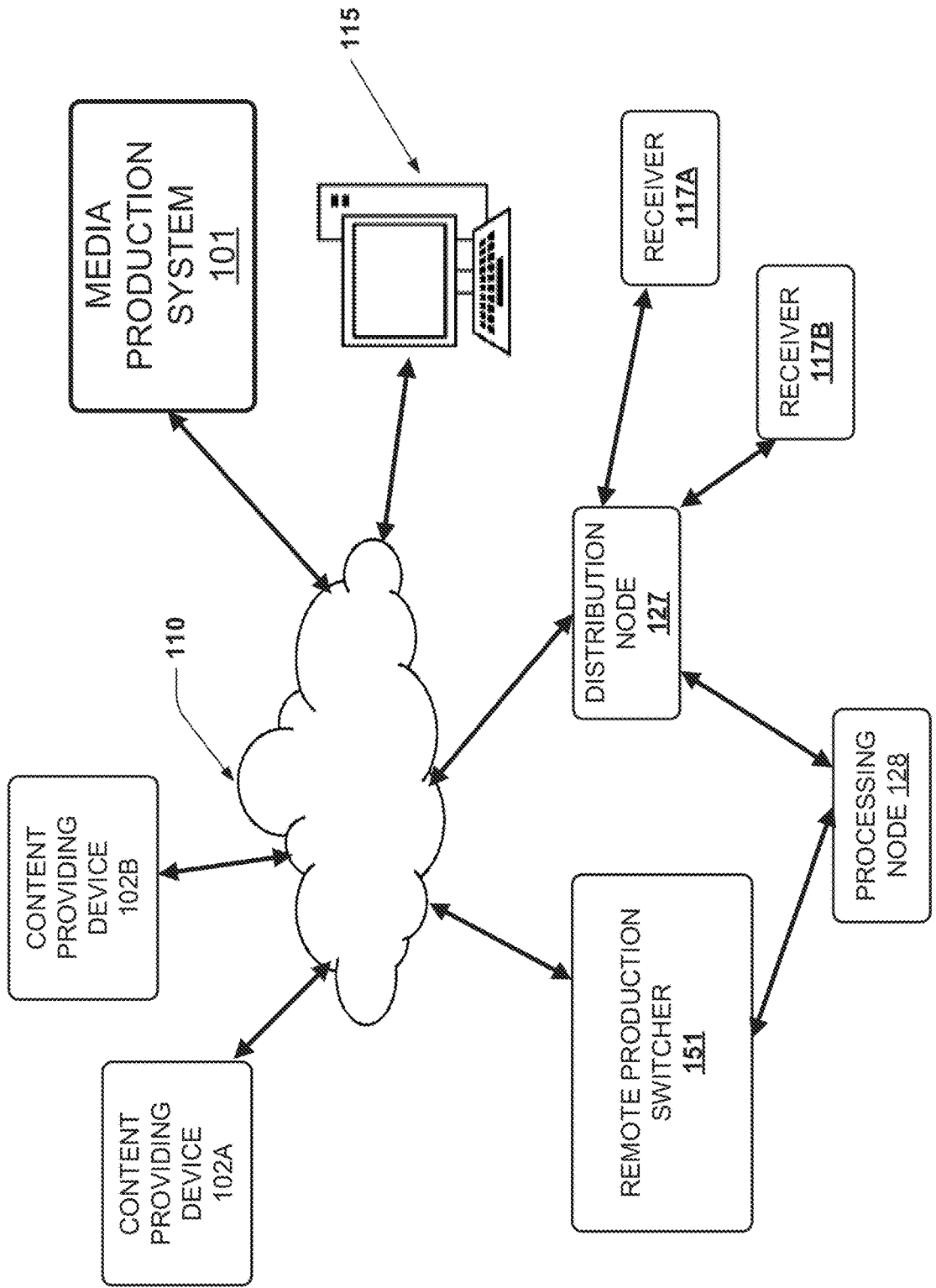
FIG. 1 is a block diagram of a system for rendering key and fill proxy streams for video processing according to an exemplary aspect.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video editing and content creation systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions and algorithms described herein may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

FIG. 1 is a block diagram of a system for rendering key and fill proxy streams for video processing according to an exemplary aspect. In general, the system 100 is shown to be in the context of a media production environment for media broadcasting and content consumption. However, it should be appreciated that the disclosed system and method can be implemented in any type of video editing and content creation environments according to exemplary aspects.

As shown, system 100 includes a plurality of content providing devices 102A and 102B. In an exemplary aspect, the plurality of content generating devices 102A and 102B can be configured for an A/V feed (e.g., media streams) across links via the network 110. Moreover, it is noted that while only two devices are shown, the system 100 can be implemented using any number of content providing devices. The plurality of content providing devices 102A and 102B can also include, for example, remote cameras configured to capture live media content, such as the "talent" (e.g., news broadcasters, game commentators, or the like). Moreover, the content providing devices 102A and 102B can include Esports (electronic sports) real-time content, or the like. In yet another aspect, the content providing devices 102A and 102B can be implemented as one or more remote media content servers, for example, that are configured to store media content (e.g., sequences if video images and content streams) and distribute this content through the network 110.

As further shown, the plurality of content providing devices 102A and 102B can be coupled to a communication network, such as the Internet 110, and/or hardware conducive to internet protocol (IP). That is, system 100 can be comprised of a network of servers and network devices configured to transmit and receive video and audio signals (and ancillary data) of various formats. In one aspect, the processing components of system 100 can be executed in part of a cloud computing environment, which can be coupled to network 110. Moreover, the media production system 101 can be configured to access the video and audio signals and/or streams generated and/or provided by the content providing devices 102A and 102B, or information related to the various signals and content presented therein.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 100 that can be implemented in the cloud platform as described herein.

As yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of a cloud computing environment. The one or more distribution nodes 127 (e.g., electronic devices) are configured to distribute the production media content from the media production system 101 to one or more distribution nodes (e.g., remote media devices), such as receivers 117A and 117B, which can be content consuming devices (e.g., televisions, computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content.

As further shown, system 100 can include one or more content creation devices 115 (also considered to be video editors) for editing and processing video content as part of the media production environment. As shown, the content creation device 115 is communicatively coupled to network 110 and thus to the other components of system 100 through network 110. Although the details will be described below, the content creation device 115 can be configured to receive media content (e.g., video stream and sequences of video images) from the one or more components, such as content providing devices 102A and 102B, and further configured to display this content within the confines of a video editing software (e.g., Adobe Premier®) to perform editing decisions and functions on the content before it is then finalized for the media production.

In one exemplary aspect, the content creation device 115 can be included as part of media production system 101 and/or communicatively coupled directly to media production system 101. Moreover, the content creation device 115 can be configured to decode and display the media content as a proxy signal on the video editing software to perform the video editing functions by the user of the content creation device 115.

In a further exemplary aspect, distribution node(s) 127 can be configured to distribute the finalized media content (that may be generated by media production system 101) throughout the distribution network to one or more processing node(s) 118, which may include a mix/effects engine, keyer or the like. In addition, remote distribution node(s) 127 can be configured to feed remote processing node(s) 128 via a direct link, or via Internet 103 connection. Examples of remote distribution node(s) 127 and processing node(s) 128 may include remote production switchers similar to remote production switcher 151 or remote signal processors.

In general, media content captured or otherwise generated/provided by content providing devices 102A and 102B will be captured in a high or broadcast quality encoding (e.g., HDR format). However, remote video editors in content creation and processing environments, such as system 100 shown in FIG. 1, only require a lower or proxy quality encoding (e.g., at a lower resolution) as compared with HDR format, for example. The system and method disclosed herein takes advantage of the fact that the spatial quality of the "alpha" portion of the image (i.e., of the media content that is being edited) can be in a lower resolution than the visible portion of the image. Moreover, the system and method also takes advantage of the fact that the intended use of the rendered picture in the video editing and content creation environment is for proxy display (i.e., at the lower resolution) since the user of the video editing software has a reduced expectation and need for picture quality.

Figure 2:
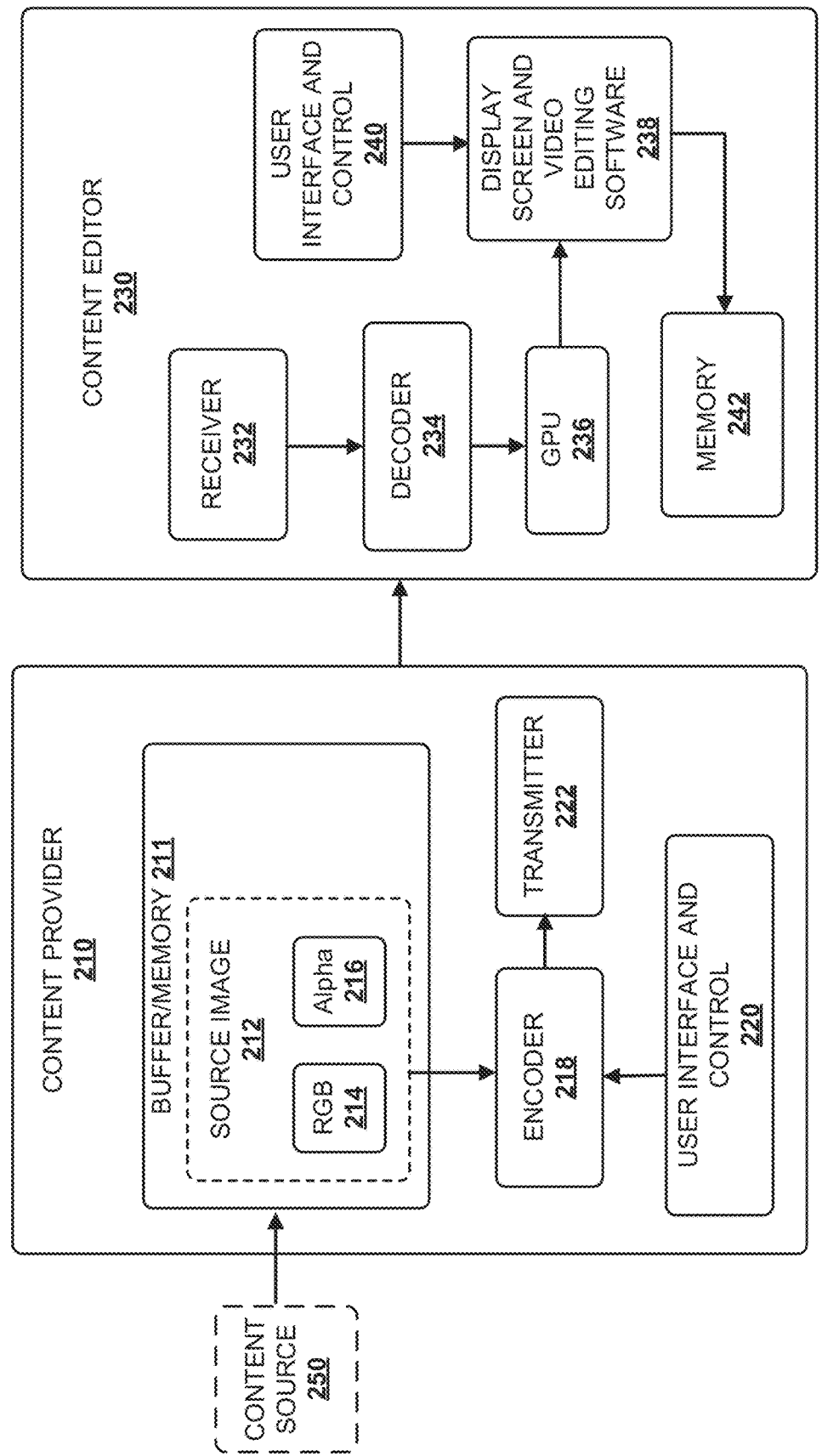
FIG. 2 is a block diagram of components shown in FIG. 1 of the system for rendering key and fill proxy streams for video processing according to an exemplary aspect.

FIG. 2 is a block diagram of components shown in FIG. 1 of the system for rendering key and fill proxy streams for video processing according to an exemplary aspect. In general, the system 200 includes a content provider 210 and a content editor 230. The content provider 210 can correspond to any component of system 100 for providing content using the exemplary algorithms and techniques described herein. For example, content provider 210 can be one or more of content providing devices 102A and 102B and/or media production system 101, as described above. Moreover, content editor 230 can correspond to content creation device 115 of FIG. 1 and is configured to receive and decode content streams for video editing and content creation processing when the decoded content is rendered on a display for the video editing application.

As specifically shown, content provider 210 includes electronic memory 211 (e.g., a memory buffer or database of a sequence of image data) configured to receive media content (e.g., from content source 250) that is stored thereon. According to the exemplary aspect, the media content can be stored as a plurality of source images 212 (e.g., a PNG file) that contains pixel values (e.g., RGB data 214), which is the fill data of the content, and alpha data 216, which is the monochrome video data that defines transparency levels for each portion of the respective source image 212.

In general, the alpha data 216 is data for each pixel value (e.g., RGB data 214) that is stored in an alpha channel with a value ranging from 0 to 1. Moreover, a value of "0" means that the pixel is fully transparent and does not provide any coverage information (i.e., there is no occlusion at the image pixel window because the geometry did not overlap this pixel), whereas a value of "1" means that the pixel is fully opaque because the geometry completely overlaps the pixel window. In an exemplary aspect, one the editing application is Adobe's After Effects, for example, the user can composite visual layers together. Moreover, the layers can be fully opaque, or partially transparent. When a final image is exported as a PNG file, all of the layers are flattened, with the background pixels being fully transparent and the pixels that show foreground layers being partially transparent or fully opaque, depending on the structure of those layers. These transparency levels are defined in alpha data 216 according to the exemplary aspect.

Additionally, anti-aliasing is usually performed on shape edges which will render some of those pixels partially transparent.

As further shown, the content provider 210 also includes encoder 218, transmitter 222, and optionally user interface and control 220. In one aspect, the encoder 218 can be implemented as a separate component and, for example, can be a software module implemented as a cloud service.

Encoder 218 is configured to convert a sequence of source images (e.g., PNG images) to a compression format (e.g., H.264). In this aspect, the encoder 218 is configured to create a video stream in which the picture contains both the "key" portion (e.g., RGB data 214) and the "fill" portion (e.g., alpha data 216). As will be described in more detail below, both the key and fill portions will be squeezed horizontally (e.g., formatted) so they sit side-by-side as a single image or frame. Moreover, in an exemplary aspect, the horizontal resolution of the "fill" portion will be higher than the "key" portion, since the "fill" portion is directly visible to the user as the RBG pixel values of the image. As also described above, the "key" portion of the image will be monochrome, with fully black indicating full transparency, and white indicating full opacity according to an exemplary aspect. Thus, the encoder 218 is configured to separately take the RGB data 214 and alpha data 216 to generate an encoded composite image that includes both the fill portion and key portion.

In exemplary aspects, the encoder 218 creates the composite image dependent at least partially on the source data. In particular, the PNG data can be passed to a PNG decoder which will return a buffer that can contain 32 bits of data for each pixel (R, G, B, A), although the exact layout can vary. The encoder 218 can then be configured to duplicate that data and on one copy, the encoder 218 can resize the image for the fill portion, and copy out the RGB data. On the other copy, the encoder 218 can resize for the key portion and copy out the A data.

It is also noted that while the exemplary aspect squeezes the key and fill portions horizontally, alternative aspects can be implemented. For example, another implementation for combining the key and fill portions might be to rotate the key portion by 90 degrees so that its resized resolution fits more naturally into the "squashed" space. Other variations for squeezing the key and fill portions can be implemented to those skilled in the art as long as the key and fill portions are included as sequence of encoded composite images as described herein.

Moreover, according to an exemplary aspect, a compression ratio can be defined between the fill portion and the key portion. In one aspect, this compression ratio can be predefined by a system administrator and set in advance of the video editing. For example, for given a source image 212, having a target video resolution of 512×288, the fill portion (e.g., RGB data 214) can be decoded and compressed to 75% of the target horizontal size (384×288). Moreover, the alpha data 216 can be decoded and compressed to 25% of the target size (128×288). That is, the left 75% of the composite image contains fill data and the right 25% of the composite image contains key data according to the exemplary aspect, although this ratio can be configured for particular system requirements as described herein. In other words, in an example aspect, the fill portion (e.g., RGB data 214) can be placed to the left, and the smaller key portion (e.g., alpha data 216) will be placed to the right. Thus, during operation, the encoder 218 can be configured to encode the sequence of these pictures to H.264 compression format or similar compression format, for example. It should be appreciate that while the exemplary aspect uses H.264 compression format, the exemplary system and method can be configured to work with other compression formats including, for example, H.265, VP8, VP9, MPEG2 or the like.

It should be appreciated that while the compression ratio is set to a 75% to 25% ratio in an exemplary aspect, the exact relative sizes may need to vary slightly to ensure that the dividing line does not bisect a macroblock, for example. Moreover, as also noted above, the content provider 210 can optionally include a user interface and control 220 (e.g., a GUI) in an exemplary aspect. In this aspect, the defined ratio of picture/transparency (e.g., 75% to 25%) may have an optional user input, in which the user can decide between quality and performance and define the compression ratio using user interface and control 220, which can be a sliding scale or similar user input. As a general matter, it should be appreciated that the resolution assigned to the key component (e.g., alpha data 216) should be lower than the fill portion (e.g., RGB data 214).

As further shown, the content provider 210 includes a transmitter 222 that is configured to transmit the encoded composite image to content editor 230. Content editor 230 includes receiver 232 configured to receive the encoded composite image and load the received content to decoder 234. In general, both transmitter 222 and receiver 232 can include standard input/output (I/O) ports, such as network interface controllers, that are configured to transmit and receive media streams as would be appreciated to those skilled in the art.

As further shown, content editor 230 includes decoder 234 (i.e., a single decoder) that is configured to decode the encoded composite image received from content provider 210, which is in a compressed format such as the H.264 compression format. The decoded image is then passed to a renderer/compositor, which can be implemented by a graphics processing unit (GPU) 236, for example. In general, GPUs are specialized electronic circuits that are constructed to rapidly manipulate and alter their memory contents to accelerate the creation of images in a frame buffer that is configured for output to a display device (e.g., the display screen 238 of the content editor 230). Existing GPUs are very efficient at manipulating computer graphics and image processing by providing a highly parallel structure that processes large blocks of data in parallel.

In this instance, the renderer/compositor executed by GPU 236 is configured to extract the pixel values from the key portion (e.g., alpha data 216) of the frame, and apply them as transparency values to the left part of the frame, i.e., the fill portion (e.g., RGB data 214). In an exemplary aspect, rendering can be performed using WebGL or OpenGL, so a simple fragment shader can be defined and executed by GPU 236 to perform this operation. In general, a shader is a type of software code (i.e., a computer program) that, when executed by a processor and specifically GPU 236, is for shading in 3D scenes (i.e., the production of appropriate levels of light, darkness, and color in a rendered image). Moreover, a fragment shader is the stage of the shader (also executed by GPU 236) that is configured to determine the RGBA values for each rendered pixel of the frame. It is also noted that the decoded output frame will typically be in YUV color-space, so additional shader code may be needed to convert from YUV color-space to RGB according to an exemplary aspect.

In any event, the content (i.e., the fill portion with transparency values applied thereto) is then rendered by the video editing and content creation software on display screen 238. As noted above, the intended use of the rendered picture in the video editing and content creation environment is for proxy display (i.e., at the lower resolution) since the user of the video editing software has a reduced expectation and need for picture quality. This proxy video is displayed on display screen 238 and enables a user of content editor 230 to perform typical video editing and content creation processing using user interface and control 240. The resulting editing video content (e.g., video files for streaming content) can be stored in memory 242 of content provider 230, which can be included in content creation device 115 or as a separate memory device, such as another video server according to another exemplary aspect.

It is also noted that while the disclosed system and method is described in the context of video editing and content creation, the exemplary embodiments can be provided in other aspects of video product that utilize proxy signals. For example, in a multiviewer environment that displays proxy signals, the content (fill with transparency levels) can be rendered and displayed as a source on a tile of a multiviewer display (i.e., as a proxy signal) according to an exemplary aspect.

Referring back to FIG. 1, the edited video content can then be transmitted from content creation device 115 to media production system 101 according to an exemplary aspect. In turn, media production system 101 can be a remote production switcher or remote media production control center for finalizing the media production before distributing to content consuming devices, such as receiver 117A or 117B, for example.

Figure 3:
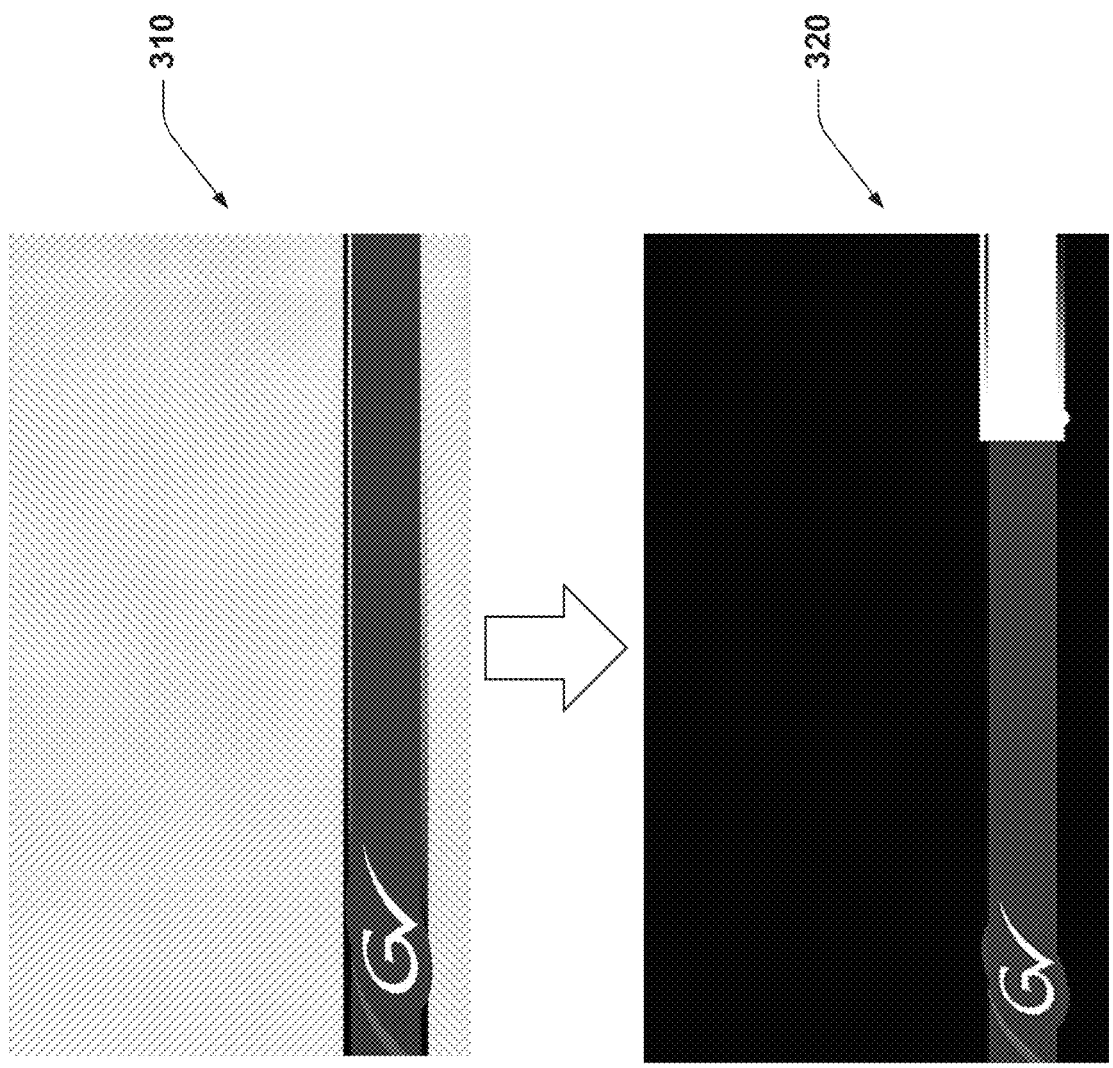
FIG. 3 illustrates an example of an encoded image resulting from the method of rendering key and fill proxy streams for video processing according to an exemplary aspect.

FIG. 3 illustrates an example of an encoded image resulting from the method of rendering key and fill proxy streams for video processing according to an exemplary aspect. As shown, image 310 illustrates a video frame or image (e.g., a PNG file) before encoding by encoder 218 using the techniques and algorithms described above. The resulting encoded composite image is shown as image 320 after encoded by encoder 218 as described above. As shown, the image 320 includes a visible portion on the left and transparency levels on the right. As noted above and according to an exemplary aspect, white indicates full opacity whereas black indicates full transparency. Moreover, the renderer/compositor executed by GPU 236 is configured to render this encoded composite image 320 as also described above before the result image is displayed by the video editor, which can then be edited accordingly via user interface and control 240, for example.

As noted above, the compression ratio can be a predefined ratio for the fill and key portions (e.g., 75% to 25%). As a result, the fragment shader (i.e., executed by the GPU 236) can be configured to use a hard-coded value of 0.75 as the dividing point between the fill and key portions of the encoded composite image. However, this compression can be made more flexible by making the division value a shader uniform that can be specified dynamically, for example, by user interface and control 220 of content provider 210. The result of applying this shader is that the transparency is correctly reassembled by GPU 236, and the render output looks similar to the first image (e.g., image 310), albeit with lower quality as a proxy signal.

According to the exemplary aspects described above, a system is provided for video editing and content creation the provides for rendering key and fill proxy streams that consume a single video decoder (e.g., decoder 234) and can be used in a system (e.g., content editor 230) with limited processing resources. As a result, the disclosed system and method significantly reduces resource requirements for decoding and rendering key and fill video elements by sacrificing spatial quality of the overall rendered image. This is achieved by combining both key and fill portions into the same encoded video stream (i.e., a sequence of the encoded composite images described above) and uses a fragment shader (e.g., a GLSL fragment shader) to render the frames correctly on a display screen for subsequent editing thereof.

Figure 4:
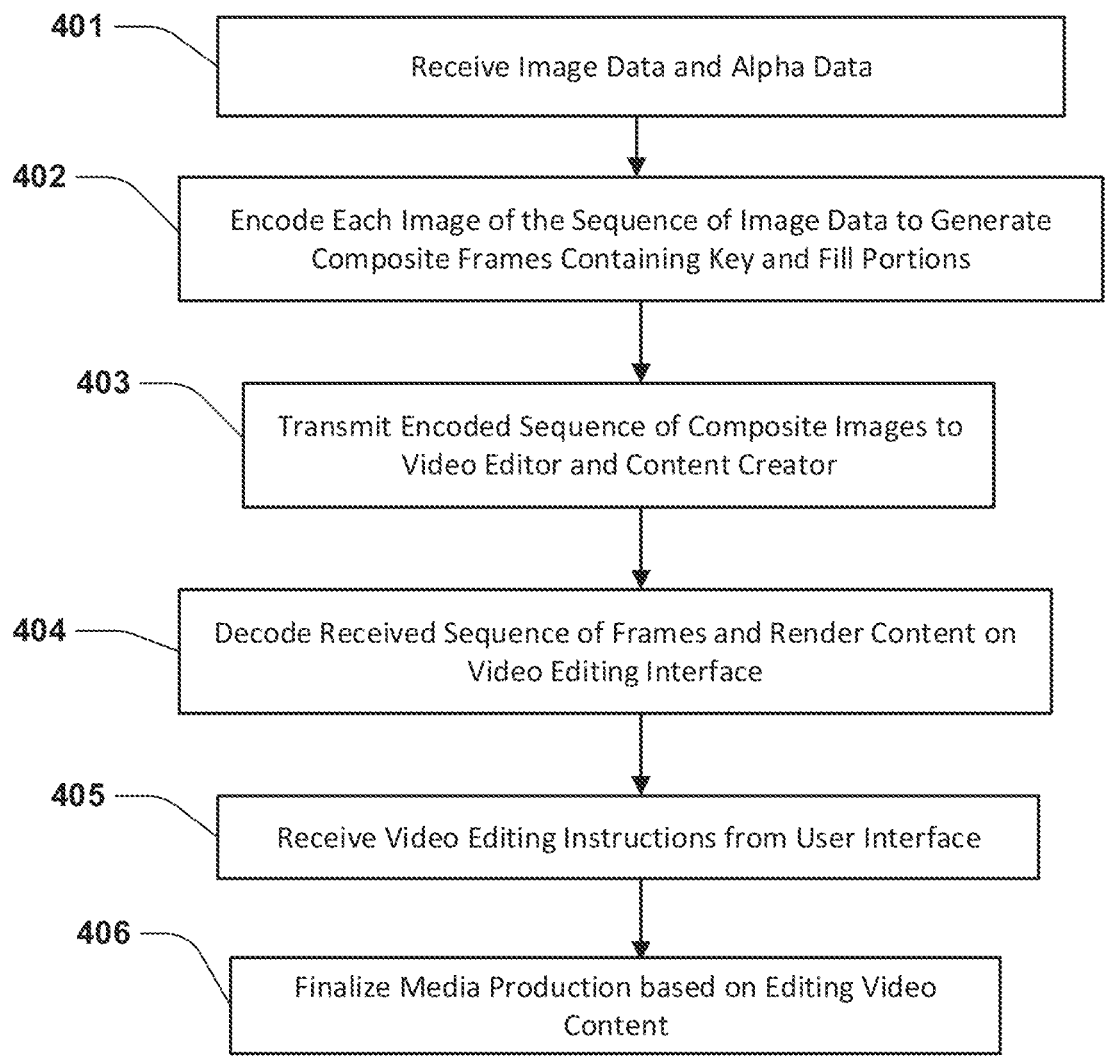
FIG. 4 is a flowchart illustrating a method for rendering key and fill proxy streams for video processing according to an exemplary aspect.

FIG. 4 is a flowchart illustrating a method for rendering key and fill proxy streams for video processing according to an exemplary aspect. In general, it should be appreciated that the method 400 may be performed using one or more of the exemplary systems described above with respect to FIGS. 1 and 2.

As shown, image data (e.g., RGB data 214) and alpha data (e.g., alpha data 216) is received at step 401 by content provider 210. As described above, the image data can be generated by a production camera, a video server or any similar electronic component configured to generate or otherwise provide a sequence of video images. Next, at step 402, each image of the video sequence is encoded to include both the key portion from the alpha data 216 and the fill portion from the image data 214. An example of the encoded composite image is shown as image 320 in FIG. 3 in which the fill portion is on the left side and lined up side-by-side with the key portion on the right side of the image.

At step 403, the sequence of encoded composite images is transmitted (or otherwise provided) to the video editor and content creator. That is, at the request of a client device to obtain media content for editing, for example, to prepare a video production, the content provided 210 can be configured to transmit the encoded images to the client device to be rendered by a video editor (e.g., Adobe Premier). At step 404, the client device (e.g., content creation device 115) receives the encoded content, which will be encoded using the H264 compression format, and decodes it by a single decoder 234. A fragment shader executed by GPU 236 (e.g., a renderer or compositor) renders the content by applying the key portion (i.e., the transparency levels) to each portion (e.g., each pixel value) of the fill portion of the image. The resulting image (at a lower quality as a proxy signal) is rendered by the video editing interface at step 404.

Next, the user of content creation device 115 can perform conventional editing and content creation processes on the rendered content by user interface and control 240, for example. The edited content can be stored in memory 242 and then can subsequently be used as part of a media production at step 406 using conventional techniques as described above and would be appreciated to one skilled in the art. Advantageously, both the "key" data and the "fill" data are included in a single composite image that can be decoded by a single decoder. This reduces the load on the decoding resources of the video editor and also reduces the required bandwidth that conventional systems use by transmitted separate "key" streams and "fill" streams.

Figure 5:
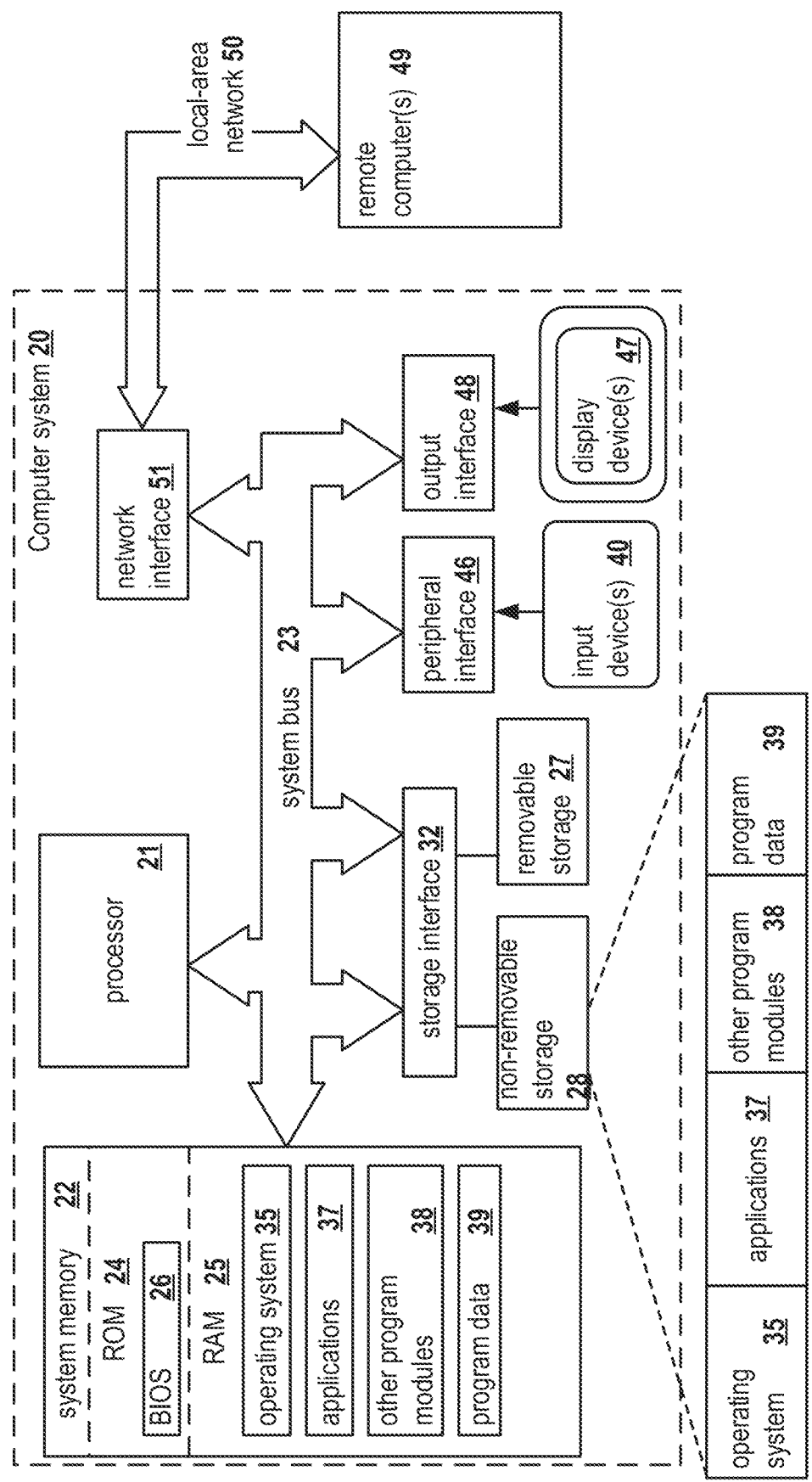
FIG. 5 is a block diagram illustrating a computer system on which aspects of systems and methods for rendering key and fill proxy streams for video processing according to an exemplary aspect.

FIG. 5 is a block diagram illustrating a computer system on which aspects of systems and methods for rendering key and fill proxy streams for video processing according to an exemplary aspect. In general, it is noted that the computer system 20 can correspond to any computing system configured to execute the systems and methods described above, including the content provider 210 and/or content editor 230 (and specifically content creation device 115), for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to scene script database 225, for example.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices. The display device 47 may be configured for the video editing and content creation applications as described herein.

Moreover, the computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIGS. 1 and 2 as well as generally to a cloud computing platform for configuring the video editing and media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103).

Examples of the network interface 51 may include an Ethernet interface, a Frame Relay interface, SONET interface, and wireless interfaces.

It should be appreciated that the above-noted components may be implemented using a combination of both hardware and software. Accordingly, in one or more example aspects, the functions described may be implemented in hardware, software, firmware, or any combination thereof.

Moreover, while aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. All structural and functional equivalents to the elements of the various aspects described throughout this disclosure that are known or later come to be known to those of ordinary skill in the art are expressly incorporated herein by reference and are intended to be encompassed by the claims.

What is claimed:

1. A system for rendering key and fill video streams for video processing, the system comprising:
    a database configured to store video data including a sequence of images and alpha data defining transparency levels for each portion of each image in the sequence of images;
    an encoder configured to encode each frame of the sequence of images to generate encoded composite frames that each contain a fill portion that corresponds to the video data and a key portion that is monochrome and defines transparency levels for each portion of the respective images, such that each encoded composite frame includes both the fill and key portions that are disposed horizontally and side-by side with respect to each other; and
    a renderer configured to receive a stream of the encoded composite frames and having a single decoder that is configured to decode each encoded composite frame to extract pixel values from the fill portion and respective transparency levels from the key portion, and further configured to apply the respectively transparency levels to the corresponding extracted pixel values to generate a proxy of the respective frame to be displayed by a video processing device,
    wherein the fill portion comprises a higher resolution than a resolution of the key portion, and
    wherein the video processing device is one of a video editing device.

2. The system according to claim 1, wherein the encoder is configured to generate each encoded frame to allocate 75% of the frame to the fill portion and 25% of the frame to the key portion.

3. The system according to claim 1, wherein the encoder is configured to generate the encoded composite frames based at least partially on source data of the video data that includes R, G, B data and the alpha data.

4. The system according to claim 1, further comprising a user interface configured to define a picture/transparency ratio between the fill portion and the key portion.

5. The system according to claim 1, wherein the renderer includes a fragment shader configured to render the proxy by applying the respectively transparency levels to the corresponding extracted pixel values.

6. A system for rendering key and fill video streams for video processing, the system comprising:
    a database configured to store video data including a sequence of images and alpha data defining transparency levels for each portion of each image in the sequence of images;
    an encoder configured to encode each frame of the sequence of images to generate encoded composite frames that each contain a fill portion that corresponds to the video data and a key portion that is monochrome and defines transparency levels for each portion of the respective images, such that each encoded composite frame includes both the fill and key portions that are disposed horizontally and side-by side with respect to each other; and a renderer configured to receive a stream of the encoded composite frames and having a single decoder that is configured to decode each encoded composite frame to extract pixel values from the fill portion and respective transparency levels from the key portion, and further configured to apply the respectively transparency levels to the corresponding extracted pixel values to generate a proxy of the respective frame to be displayed by a video processing device, wherein the fill portion comprises a higher resolution than a resolution of the key portion.

7. The system according to claim 6, wherein the fill portion comprises a higher horizontal resolution than a horizontal resolution of the key portion.

8. The system according to claim 7, wherein the encoder is configured to generate each encoded frame to allocate 75% of the frame to the fill portion and 25% of the frame to the key portion.

9. The system according to claim 7, wherein the encoder is configured to generate the encoded composite frames based at least partially on source data of the video data that includes R, G, B data and the alpha data.

10. The system according to claim 7, further comprising a user interface configured to define a picture/transparency ratio between the fill portion and the key portion.

11. The system according to claim 7, wherein the renderer includes a fragment shader configured to render the proxy by applying the respectively transparency levels to the corresponding extracted pixel values.

12. The system according to claim 6, wherein the video processing device is one of a video editing device.

13. A system for rendering key and fill video streams for video processing, the system comprising:
an encoder configured to encode each frame of a sequence of images to generate encoded composite frames that each contain a fill portion that corresponds to video data of the sequence of images and a key portion that is monochrome and defines respective transparency levels, such that each encoded composite frame includes both the fill portion and the key portion; and
a renderer configured to receive a stream of the encoded composite frames and configured to decode each encoded composite frame to extract pixel values from the fill portion and respective transparency levels from the key portion, and further configured to apply the respectively transparency levels to the corresponding extracted pixel values to generate an output video comprising modified frames to be displayed by a video processing device, wherein the fill portion comprises a higher resolution than a resolution of the key portion.

14. The system according to claim 13, further comprising a database configured to store the video data including the sequence of images and alpha data defining the transparency levels for each portion of each image in the sequence of images.

15. The system according to claim 13, wherein the fill portion and the key portion of each encoded composite frame are disposed horizontally and side-by side with respect to each other.

16. The system according to claim 13, wherein the renderer comprises a single decoder including a fragment shader configured to render the output video by applying the respectively transparency levels to the corresponding extracted pixel values.

17. The system according to claim 13, wherein the fill portion comprises a higher horizontal resolution than a horizontal resolution of the key portion.

18. The system according to claim 17, wherein the encoder is configured to generate each encoded frame to allocate 75% of the frame to the fill portion and 25% of the frame to the key portion.

19. The system according to claim 17, wherein the encoder is configured to generate the encoded composite frames based at least partially on source data of the video data that includes R, G, B data and alpha data.

20. The system according to claim 13, wherein the video processing device is one of a video editing device.

* * * * *